United States Patent
Winters et al.

(10) Patent No.: US 6,678,917 B1
(45) Date of Patent: Jan. 20, 2004

(54) WHEEL PROTECTION SYSTEM

(76) Inventors: Gary L Winters, N2543 Hodgett Ct., Waupaca, WI (US) 54881; John L. Miller, 2348 Henrietta St., Stevens Point, WI (US) 54481

( * ) Notice: Subject to any disclaimer, the term of this patent is extended or adjusted under 35 U.S.C. 154(b) by 0 days.

(21) Appl. No.: 10/058,365

(22) Filed: Jan. 28, 2002

(65) Prior Publication Data (65)

Related U.S. Application Data

(60) Provisional application No. 60/266,147, filed on Feb. 2, 2001.

(51) Int. Cl.[7] ............................................. B60B 33/00
(52) U.S. Cl. ..................................................... 16/18 CG
(58) Field of Search ....................................... 16/18 CG

(56) References Cited

U.S. PATENT DOCUMENTS

| | | | | |
|---|---|---|---|---|
| 672,138 A | * | 4/1901 | Stockwell | ................ 16/18 CG |
| 1,295,692 A | | 2/1919 | Cantlon | |
| 2,447,582 A | * | 8/1948 | Klumb | ............................ 16/44 |
| 2,450,062 A | * | 9/1948 | Voss et al. | ................ 16/18 CG |
| 2,471,958 A | * | 5/1949 | Humphreys | ............... 16/18 CG |
| 2,996,752 A | | 8/1961 | Pope | ............................... 16/18 |
| 3,083,398 A | | 4/1963 | Swalm | ............................ 16/18 |
| 3,441,974 A | * | 5/1969 | Dean | .............................. 16/33 |
| 3,744,080 A | | 7/1973 | Smith, Jr. | ................. 15/256.51 |
| 3,818,542 A | | 6/1974 | Jones | ............................. 16/18 |
| 4,025,099 A | | 5/1977 | Virden | .......................... 293/58 |
| 5,170,528 A | | 12/1992 | Navar et al. | .................... 16/18 |
| 5,173,990 A | | 12/1992 | Owen | ............................ 16/18 |
| 5,339,350 A | | 8/1994 | Thelosen | .................... 378/198 |
| 5,371,290 A | | 12/1994 | Reuter et al. | ............... 564/402 |
| 5,371,920 A | * | 12/1994 | Rainville | .................. 16/18 CG |
| 5,524,916 A | * | 6/1996 | Redens | ....................... 280/32.6 |
| 5,615,450 A | | 4/1997 | Butler | ............................. 16/18 |
| 5,873,144 A | | 2/1999 | Tupper et al. | .................. 16/18 |
| 6,125,504 A | | 10/2000 | Richards | ........................ 16/18 |

FOREIGN PATENT DOCUMENTS

| | | | | |
|---|---|---|---|---|
| EP | | 85984 A1 | * 8/1983 | ........... B60B/33/00 |

* cited by examiner

*Primary Examiner*—Anthony Knight
*Assistant Examiner*—Michael J. Kyle
(74) *Attorney, Agent, or Firm*—Andrus, Sceales, Starke & Sawall, LLP

(57) ABSTRACT

A wheel protection system for moving a hose or cable on a working surface away from the wheels of a movable device, such as a portable welder. The wheel protection system includes a separate wheel guard positioned to at least partially surround each wheel of the movable device. Each wheel guard is mounted by a resilient mounting structure that allows the wheel guard to deflect upward upon contacting an irregularity on the working surface. Each wheel guard is independently mounted such that the device can be used on an irregular surface.

15 Claims, 4 Drawing Sheets

WHEEL PROTECTION SYSTEM

CROSS-REFERENCE TO RELATED APPLICATION

The present application is based on and claims priority to U.S. Provisional Patent Application No. 60/266,147 filed on Feb. 2, 2001.

BACKGROUND OF THE INVENTION

The present invention relates to a wheel protection system. More specifically, the present invention relates to a wheel protection system including a plurality of wheel guards for the caster wheels of a welding machine such that wheel guards prevent the wheels of the welding machine from passing over and becoming stuck on various hoses and cables used with the welding machine.

Many structures, such as shopping carts, chairs, tables and various other types of machinery are mounted on caster wheels for ease of motion. When such a device is used in a crowded work environment that includes cables, cords and hoses lying on the ground, the caster wheels often contact the objects on the floor. Because of the diameter of the hoses or cables relative to the diameter of the caster wheel, the objects on the floor often prevent the continued rolling or turning movement of the snagged caster wheel, which prevents proper operation of the equipment. Additionally, it is possible that the contact between the caster wheels and the hoses or cables may result in damage or possible disconnection of the cables/hoses.

Although numerous wheel guards or shrouds have been developed for use with caster wheels, such as those shown in U.S. Pat. Nos. 5,173,990; 4,025,099; 5,339,350; 5,371,920, these systems have numerous drawbacks and disadvantages. For example, if the device supported by caster wheels is used outside or over an uneven surface, the wheel guards of the prior art are unable to compensate for the irregular surface and may be ineffective in preventing contact with cables or hoses.

Therefore, a need exists for an improved wheel protection system that can be mounted to a device supported by wheels to prevent the wheels from being entangled with the hoses and cables near the work site. Further, a need exists for a wheel protection system that allows each of the wheel guards to deflect upward away from the ground upon use on an irregular work surface while still providing the required clearance between the guard and ground to prevent entanglement with the hoses or cables.

SUMMARY OF THE INVENTION

The present invention is a wheel protection system for use with a device supported by a plurality of wheels to prevent the wheels from contacting a hose or cable on the ground when the device is being used at a work site. The wheel protection system includes a wheel guard positioned to at least partially surround each of the wheels of the device. Each wheel guard is preferably formed from plastic and includes a lower lip portion that extends away from the wheel to contact a hose or cable during movement of the device.

Each of the wheel guards is mounted to the device by a resilient mounting structure. The resilient mounting structure is positioned between each wheel guard and the frame of the device. The resilient mounting structure for each of the wheel guards allows the wheel guard to deflect upward upon contacting the ground during movement of the device.

Each resilient mounting structure includes a pair of support rods each supported by a mounting bracket. Each support rod is connected at its lower end to one end of the wheel guard. The opposite end of the support rod passes through a mounting bracket and is movable vertically with respect to the mounting bracket. The pair of support rods allow each end of the wheel guard to deflect upward independently while also allowing the entire wheel guard to deflect upward upon contacting the ground.

Each mounting bracket includes a vertical portion and a top flange. A spring is positioned around the support rod and entrapped between the top flange of the mounting bracket and a collar attached to the outer circumference of the support rod. The collar limits the downward movement of the support rod and defines a normal operating position for the support rod and the connected wheel guard.

When the wheel guard contacts the ground, the wheel guard moves upward to compress the spring. After the wheel guard has passed over the projecting article on the ground, the bias force of the spring returns the wheel guard to its normal, operating position.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
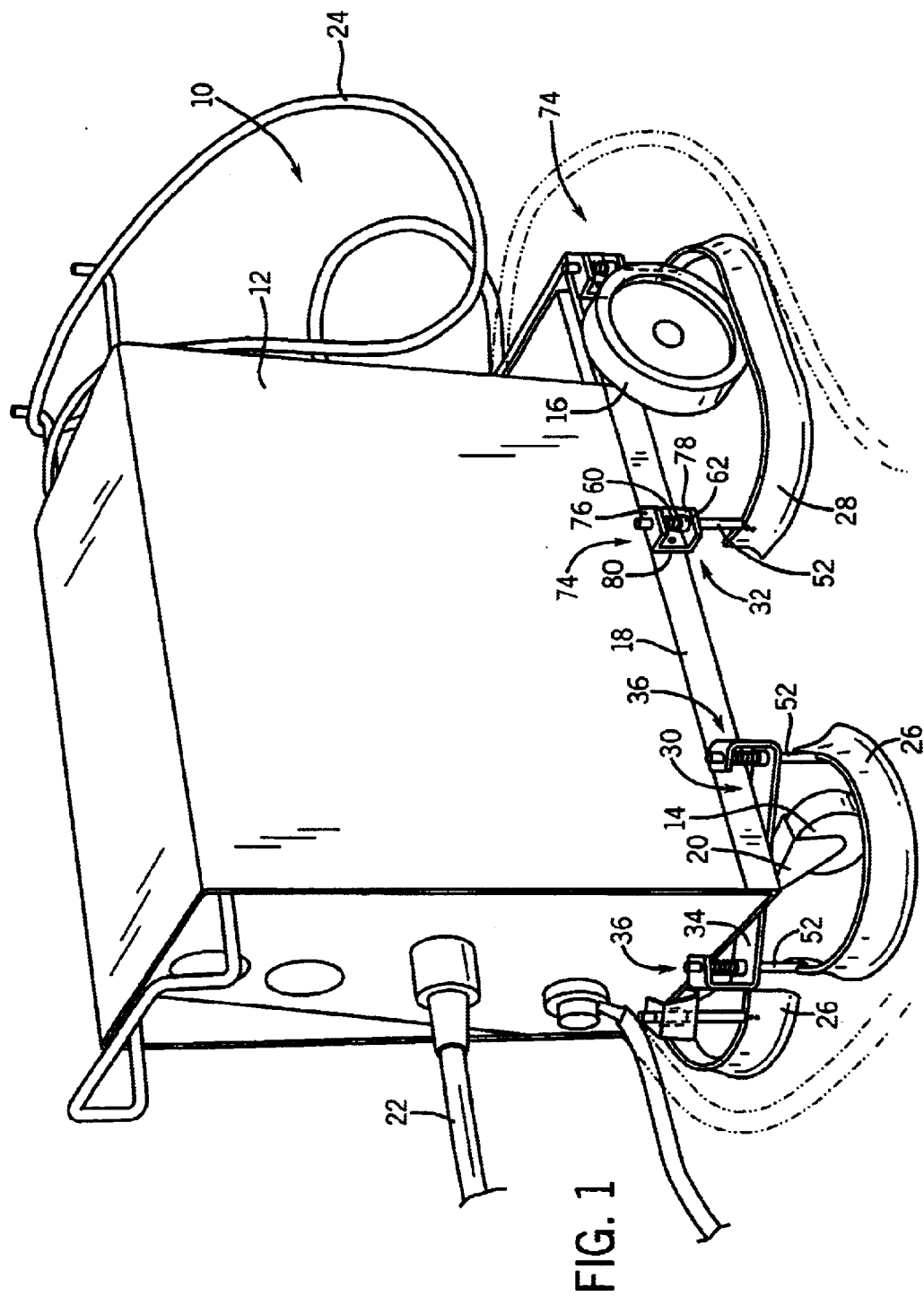
FIG. 1 is a front perspective view illustrating the mounting of front and rear wheel shrouds on a portable welder.

FIG. 1 illustrates a portable welder 10 that includes a main body 12 supported by a pair of front caster wheels 14 and a pair of back wheels 16. Both the front caster wheels 14 and the back wheels 16 are supported by lower frame 18 of the portable welder 10. The pair of front caster wheels 14 are each rotatably supported about the lower frame 18 by a rotating caster 20.

The portable welder 10 includes a plurality of hoses 22 and cables 24 that end up resting on the work surface supporting the portable welder 10 when the portable welder 10 is in use. When the portable welder 10 is moved around at a work site, the front caster wheels 14 and the rear wheels 16 often contact the hoses 22 and cables 24, which may prevent continued movement of the portable welder 10 or detachment of the cables or hoses.

In accordance with the present invention, a pair of front wheel guards 26 are mounted to the portable welder 10 to at least partially surround and protect the front caster wheels 14. A pair of back wheel guards 28 are attached to the portable welder 10 to at least partially surround and protect the rear wheels 16. Each of the front wheel guards 26 and the back wheel guards 28 contact the hoses and cables on the ground and prevent the hoses and cables from becoming caught under the front caster wheels 14 and the rear wheels 16 as will be described in greater detail below.

Figure 2:
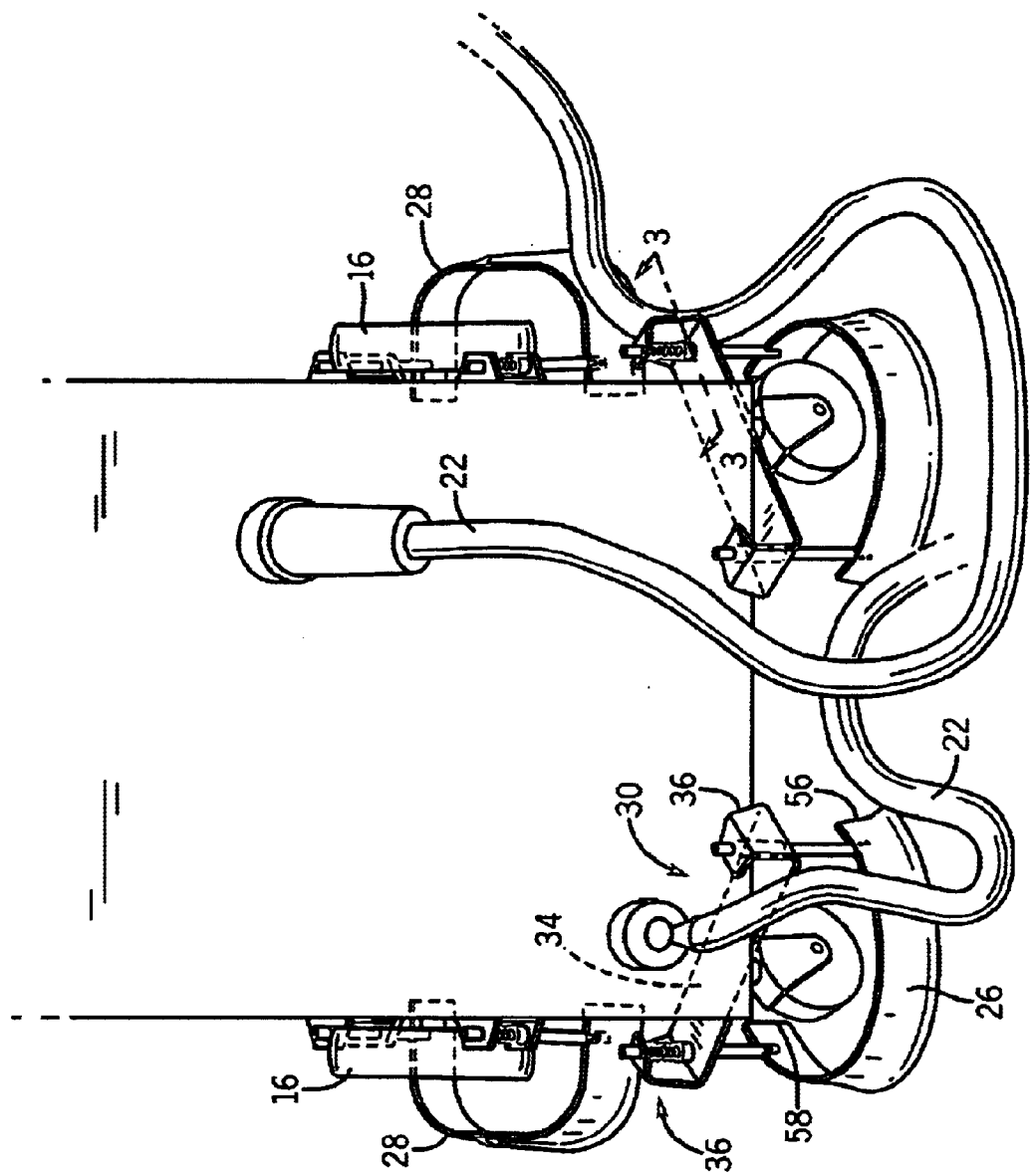
FIG. 2 is a front view of the portable welder incorporating the wheel shrouds of the present invention.

As can be seen in FIGS. 1 and 2, a resilient front mounting structure 30 is used to support each of the front wheel guards 26 relative to the body 12 of the portable welder, while a similar resilient back mounting structure 32 is used to support each of the back wheel guards 28 relative to the body 12. In general, the resilient mounting structures 30 and 32 allow the respective front wheel guards 26 and back wheel guards 28 to deflect upward upon contacting an irregularity on the work surface on which the portable welder 10 is supported.

Figure 3:
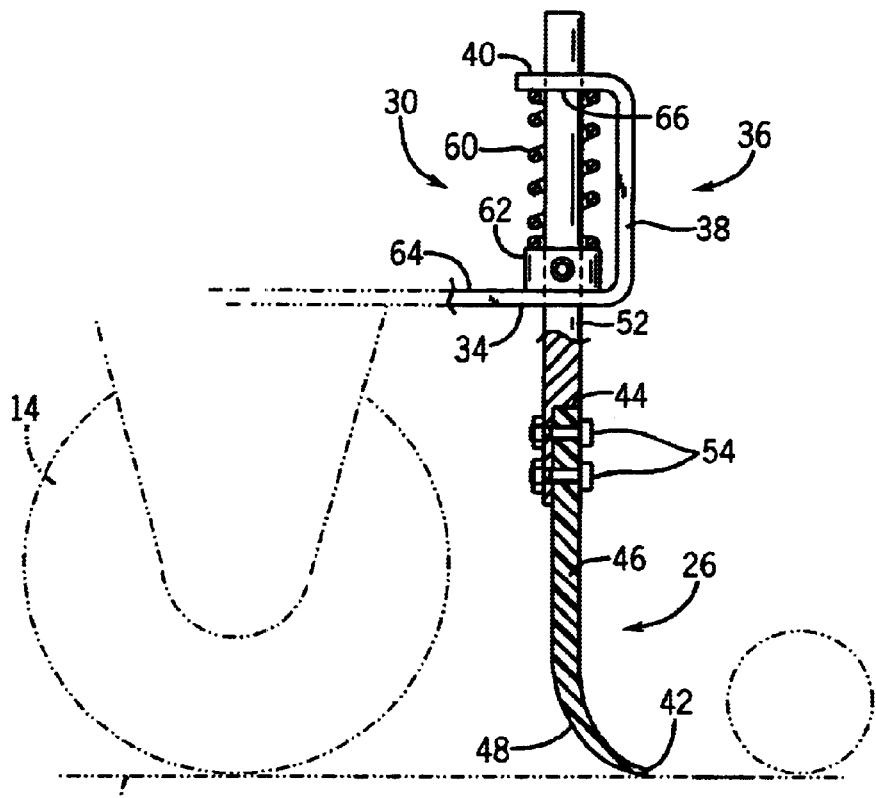
FIG. 3 is a section view taken along line 3—3 of FIG. 2 illustrating the resilient mounting structure used to attach the wheel shroud to the portable welder.

Referring now to FIGS. 1 and 2, the resilient front mounting structure 30 includes an attachment plate 34 that extends beneath the lower frame 18 of the welder and is securely attached to the bottom surface of the body 12. As can be seen in FIGS. 1 and 3, the attachment plate 34 includes a pair of mounting brackets 36 on each of its opposite ends. Specifically, the attachment plate 34 defines a vertical support portion 38 and a horizontal top flange 40. In the preferred embodiment of the invention, the mounting brackets 36 are integrally formed with the attachment plate 34 by bending the attachment plate 34 to form the vertical support portion 38 and the top flange 40.

FIG. 3 illustrates a section view of the front wheel guard 26. Although only the front wheel guard 26 and the resilient front mounting structure 30 are shown in FIG. 3, it should be understood that the back wheel guard 28 and the resilient back mounting structure 32 are similar in construction.

As seen in FIG. 3, the front wheel guard 26 extends between a bottom edge 42 and a top edge 44. The front wheel guard 26 includes a generally vertical main body 46 that terminates in a lower lip portion 48. The lip portion 48 is outwardly curved away from the front caster wheel 14 and terminates at the bottom edge 42. As shown in FIG. 3, the bottom edge 42 is spaced slightly above the work surface 50 such that the bottom edge 42 does not scrape on the work surface 50 during normal operation of the portable welder. In the preferred embodiment of the invention, both the front wheel guards 26 and the back wheel guards 28 are thermoformed from plastic into the curved configuration illustrated.

As can be seen in FIG. 3, the top end of the front wheel guard 26 is securely attached to a support rod 52 by a pair of connectors 54. As can be seen in FIGS. 1 and 2, each of the front wheel guards 26 is supported by a pair of support rods 52. The support rods 52 are connected to each of the front wheel guards 26 near the first end 56 and second end 58 of the continuous plastic section forming the wheel guard 26. In this manner, the front wheel guard 26 is sufficiently supported around the respective front caster wheel 14.

In the preferred embodiment of the invention, the support rod 52 is formed from steel and attached to the plastic wheel guard. In addition to the method of attachment illustrated in FIG. 3, it is also contemplated by the inventors that the lower end of the support rod 52 could be molded into the wheel guard to secure the wheel guard to the support rod. Alternatively, the lower end of the support rod 52 could include external threads that would be received within an internally threaded insert molded into the respective wheel guard. Therefore, numerous methods of attaching the support rod 52 to each of the wheel guards are contemplated as being within the scope of the present invention.

Referring back to FIG. 3, the support rod 52 extends through an opening in the attachment plate 34 and aligned opening in the top flange 40. The openings in the attachment plate 34 and the top flange 40 are slightly larger than the diameter of the support rod 52 such that the support rod 52 is freely movable vertically along the longitudinal axis of the support rod 52.

As illustrated in FIG. 3, a spring 60 is positioned surrounding the support rod 52 between the attachment plate 34 and the top flange 40. A collar 62 is securely attached to the outer circumference of the support rod 52 and contacts the upper surface 64 of the attachment plate 34 to limit the downward movement of the support rod 52 relative to the attachment plate 34.

As can be seen in FIG. 3, the spring 60 is entrapped between the top surface of the collar 62 and bottom surface 66 of the top flange 40. The spring 60 exerts a downward bias force on the collar 62 to hold the collar 62 in contact with the upper surface 64 of the attachment plate 34. In this manner, the spring 60 maintains the front wheel guard 26 in the normal, operating condition illustrated in FIG. 3. In the preferred embodiment of the invention, the bottom edge 42 of the front wheel guard 26 is spaced above the work surface less than ½ inch in the normal operating position.

Figure 4:
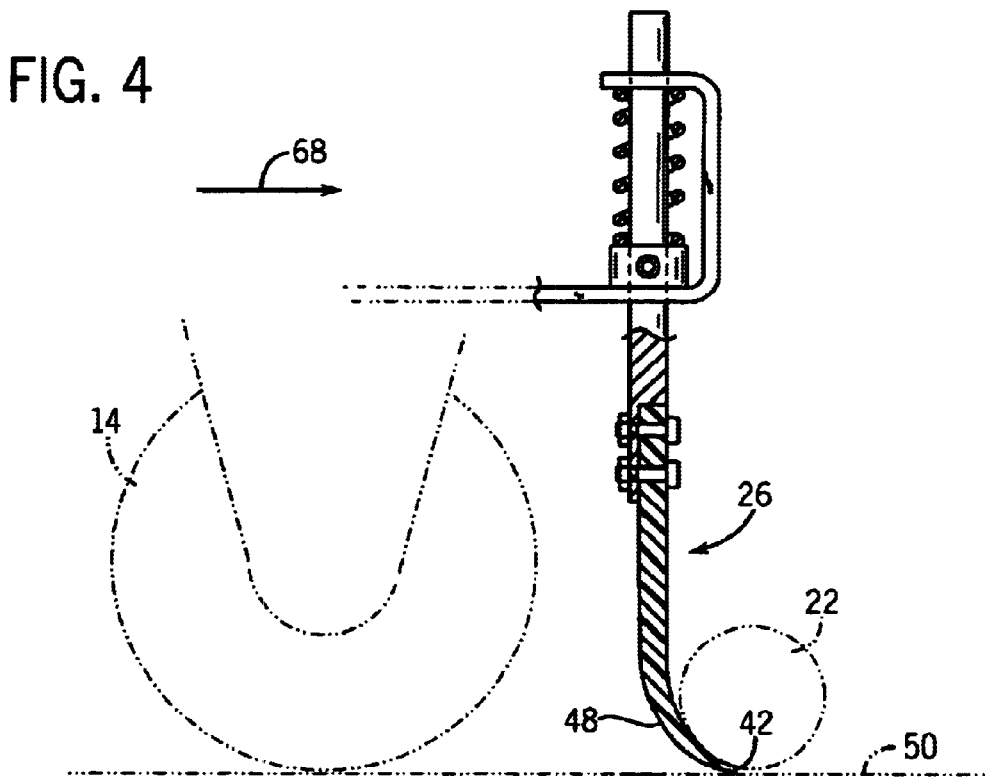
FIG. 4 is a section view similar to FIG. 3 illustrating the contact between the wheel shroud and a hose or cable.

As shown in FIG. 4, when the welder is moved in the direction of arrow 68, the lower lip 48 of the front wheel guard 26 contacts the hose 22 and prevents the hose 22 from becoming stuck beneath the front caster wheel 14. As can be understood in FIG. 4, the spacing between the bottom edge 42 and the work surface 50 must be less than the diameter of the hose 22 to prevent the hose 22 from passing beneath the bottom edge 42.

Figure 5:
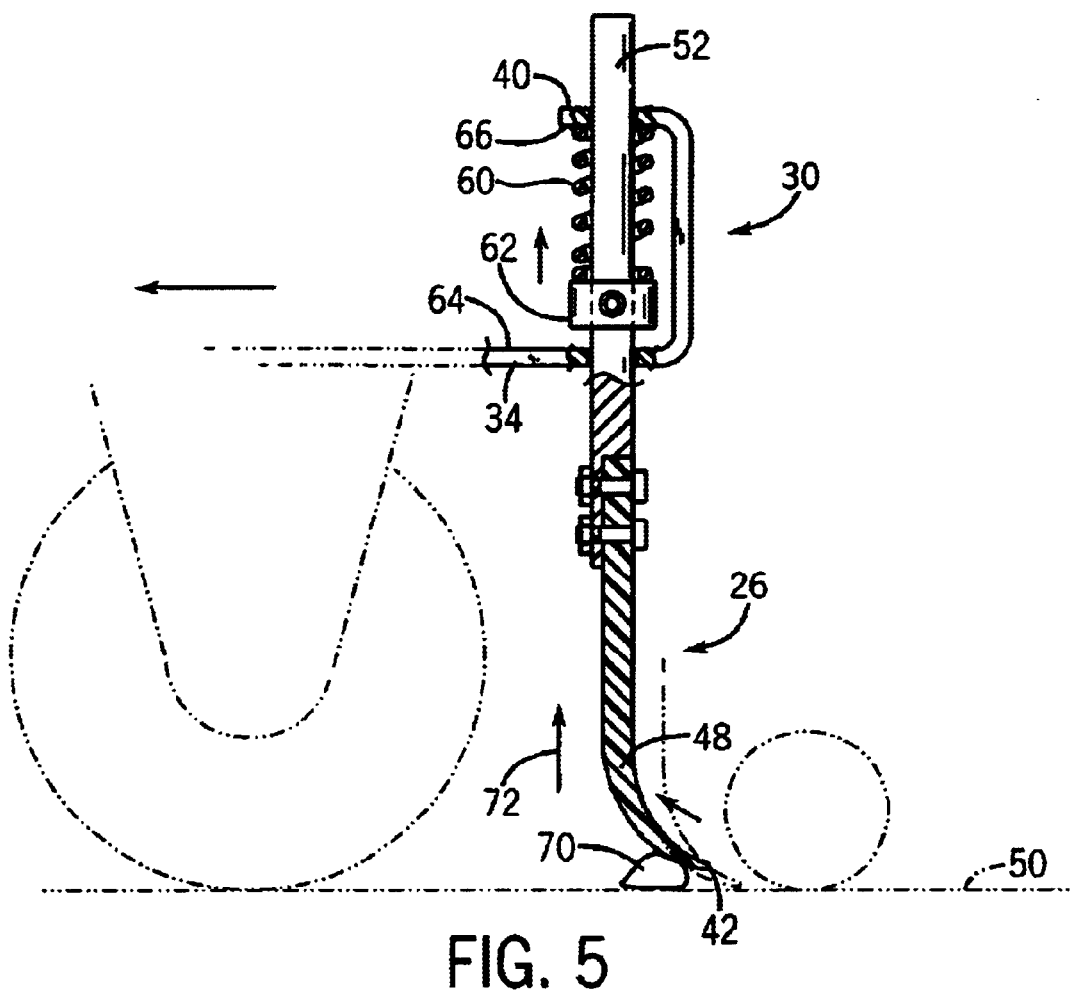
FIG. 5 is a view similar to FIG. 4 illustrating the deflection of the wheel shroud upon contact with an object on the work surface.

Referring now to FIG. 5, if the bottom edge 42 of the front wheel guard 26 contacts an imperfection, such as stone 70, on the work surface 50, the resilient front mounting structure 30 allows the front wheel guard 26 to deflect upward, as illustrated by arrow 72. Specifically, contact between the lower lip 48 and the stone 70 causes the front wheel guard 26 to move upward against the bias spring created by spring 60. Since the support rod 52 is freely movable within a pair of aligned holes in the attachment plate 34 and the top flange 40, the support rod 52 moves upward. During this upward movement, the collar 62 compresses the spring 60 against the bottom surface 66 of the top flange 40. Once the front wheel guard 26 has passed over the stone 70, the bias force of the spring 60 returns the support rod 52 to its normal operating condition in which the collar 62 is in contact with the upper surface 64 of the attachment plate 34.

The resilient front mounting structure 30 allows the front wheel guard 26 to deflect upward upon contacting any irregularity along the work surface 50. The resilient mounting structure is particularly useful when the welder is used outside or at a work site having relatively rough terrain. The resilient mounting structure reduces the possible damage to the plastic wheel guard upon contacting the work surface. Additionally, the resilient mounting structure allows for a smaller gap between the bottom edge 42 and the work surface since the resilient mounting structure compensates for irregularities on the work surface instead of having to provide additional clearance full time between the bottom of the wheel guard and the work surface.

As described above, each of the front wheel guards 26 and the back wheel guards 28 are supported by a pair of support rods 52 and mounting brackets. Specifically, the support rods are connected near the opposite ends of the wheel guard. The spacing between the support rods along each of the wheel guards allows each of the ends to deflect upward independently upon contacting the ground. Additionally, the pair of support rods and mounting brackets allow the center of the wheel guard to deflect upward by compressing both of the springs 60 used to support the wheel guard. This configuration increases the type of movement possible upon contacting the ground.

Although FIGS. 3–5 illustrate the resilient front mounting structure 30 used to support the pair of front wheel guides 26, the resilient back mounting structure 32 is similar in operating principle. As can be seen in FIG. 1, the resilient back mounting structure 32 includes a pair of mounting brackets 74 that each receive one of the support rods 52 used to support the opposite ends of the back wheel guard 28. Each of the mounting brackets 74 includes a top flange 76 and a bottom flange 78 joined by a vertical support portion 80. The vertical support portion 80 of each mounting bracket 74 is attached to the lower frame 18 by a pair of threaded connectors.

As illustrated in FIG. 1, a spring 60 surrounds the support rod 52 between the upper flange 76 and the lower flange 78. The collar 62 restricts the downward movement of the support rod 52 and defines the normal operating position of the back wheel guard 28. As can be understood in FIG. 1, the resilient back mounting structure functions identically to the resilient front mounting structure 30 such that the back wheel guards 28 can deflect upward upon contacting an irregularity on the support surface.

Various alternatives and embodiments are contemplated as being within the scope of the following claims particularly pointing out and distinctly claiming the subject matter regarded as the invention.

We claim:

1. A wheel protection system for use with a device having a frame supported by a plurality if independent wheels, the system comprising:
    a plurality of wheel guards each positioned to at least partially surround one of the wheels, each wheel guard having a bottom edge; and
    a resilient mounting structure interposed between each wheel guard and the device frame to support the wheel guard such that the bottom edge of the wheel guard is spaced above a work surface on which the device is supported by the plurality of independent wheels;
    wherein the resilient mounting structure allows the wheel guard to deflect upward and away from the work surface independently from the movement of the one of the wheels it surrounds, upon the wheel guard contacting the work surface.

2. The wheel protection system of claim 1 wherein each wheel guard is formed from injection molded plastic.

3. The wheel protection system of claim 1 wherein each wheel guard extends between a top edge and the bottom edge, wherein the wheel guard curves outward from the top edge to the bottom edge.

4. The wheel protection system of claim 3 wherein the bottom edge surface includes a contact lip positioned above the work surface.

5. The wheel protection system of claim 3 wherein the resilient mounting system includes a pair of support rods connected to the top edge of the wheel guard, each support rod being movably received in a mounting bracket attached to the device.

6. The wheel protection system of claim 5 further comprising a spring interposed between the support rod and the mounting bracket, wherein the wheel guard is movable upward against a bias force of the spring upon contact with the work surface.

7. The wheel protection system of claim 1 wherein the wheel guard is spaced less than ½ inch above the ground.

8. A wheel protection system for use with a portable welder having a body supported by a pair of front caster wheels and a pair of back wheels, the system comprising:
    a pair of front wheel guards each positioned to partially surround one of the front wheels, each front wheel guard including a bottom edge;
    a resilient front mounting structure interposed between each front wheel guard and the body of the welder to support the front wheel guard such that the bottom edge of the front wheel guard is above the ground in a normal operating position;
    a pair of back wheel guards each positioned to partially surround one of the back wheels, each back wheel guard including a bottom edge; and
    a resilient back mounting structure interposed between each back wheel guard and the body of the welder to support the back wheel guard such that the bottom edge of the back wheel guard is above the ground in a normal operating position;
    wherein the resilient front mounting structure and the resilient back mounting structure allow the front wheel guards and the back wheel guards to deflect upward away from the work surface independently from the movement of the front caster wheels and back wheels, respectively, when the wheel guards contact an imperfection on the work surface.

9. The wheel protection system of claim 8 wherein the front wheel guards and the back wheel guards are formed from plastic.

10. The wheel protection system of claim 8 wherein each resilient front mounting structure includes a pair of support rods connected to the front wheel guard, each support rod being movably received in a mounting bracket attachable to the welder body.

11. The wheel protection system of claim 10 further comprising a spring interposed between each support rod and the mounting bracket such that the front wheel guard is biased into the normal operating position and is movable upward against the bias force of the spring.

12. The wheel protection system of claim 11 wherein the resilient front mounting structure includes an attachment plate that supports the mounting brackets and is positioned between one of the front caster wheels and the welder body.

13. The caster wheel protection system of claim 8 wherein each resilient back mounting structure includes a pair of support rods connected to each of the back wheel guards, each support rod being movably received within a mounting bracket attachable to the welder body.

14. The wheel protection system of claim 13 further comprising a spring interposed between each of the support rods and one of the mounting brackets such that the back wheel guard is biased into the normal operating position and is movable upward against the bias force of the spring.

15. The wheel protection system of claim 14 wherein the mounting brackets of the back mounting structure are connected directly to the body of the portable welder.

* * * * *